UNITED STATES PATENT OFFICE.

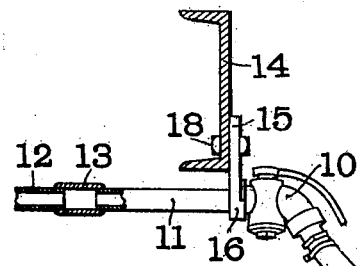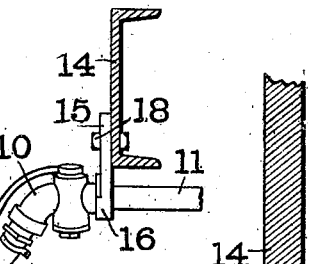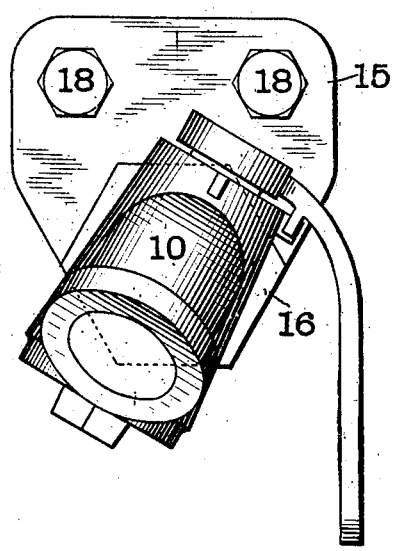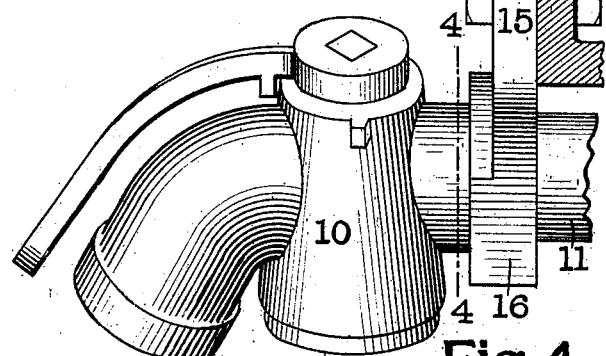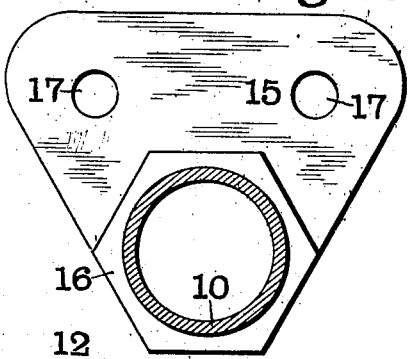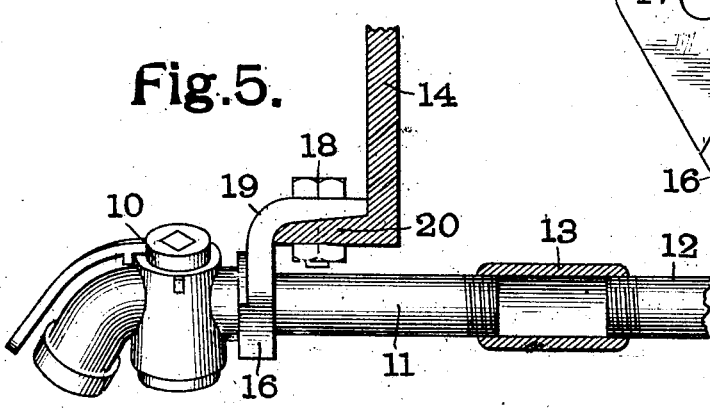

LOUIS A. HOERR, OF ST. LOUIS, MISSOURI.

ANGLE-COCK FOR RAILWAY-CARS.

No. 925,103.

Specification of Letters Patent.

Patented June 15, 1909.

Application filed March 5, 1909. Serial No. 481,491.

*To all whom it may concern:*

Be it known that I, LOUIS A. HOERR, a citizen of the United States, residing at the city of St. Louis, in the State of Missouri, have invented a certain new and useful Angle-Cock for Railway-Cars, of which the following is such a full, clear, and exact description as will enable any one skilled in the art to which it appertains to make and use the same, reference being had to the accompanying drawings, forming part of this specification.

The angle cocks of air brake pipes on railway cars are connected by hose pipes provided with couplers which automatically release when the hose pipes are brought into horizontal position by the separation of the cars. The brakemen, therefore, do not, as a usual thing, uncouple the hose pipes when two cars are uncoupled. These couplings, however, often fail to automatically release and the result is that either the hose pipes are broken or the angle cocks are pulled from the cars and lost. In order to prevent the entire air brake pipe from being disarranged when this occurs, a very slight connection is made between the angle cock and the main train pipe. The difficulty of loosing the angle cocks has been heretofore overcome by providing an angle cock holder made separate from the angle cock itself and engaging either with the head of the angle cock or with the head of the angle cock and the adjacent air brake pipe. There are two objections to such holders, however: First, the holders add considerably to the cost of the angle cock equipment, and second, as it is not practicable to machine them, they do not fit the angle cocks accurately and consequently the angle cocks are allowed to move so that the slight joint above referred to is often worked loose so that the air escapes and the brake system is rendered inadequate.

The object of my invention is to provide an angle cock for railway cars to overcome the above difficulties and this I accomplish by forming integral with the angle cock a lug or plate by means of which it may be rigidly secured to the railway car.

In the accompanying drawings which illustrate two forms of angle cock made in accordance with my invention, Figure 1 is a side view on a reduced scale, showing a portion of two railway cars, together with their train pipes, hose pipes and angle cock connections; Fig. 2 is a view of one of the angle cocks; Fig. 3 is a side view and Fig. 4 is a section on the line 4—4 of Fig. 3. Fig. 5 is a view similar to Fig. 4 but showing a slight modification.

Like marks of reference refer to similar parts in the several views of the drawings.

10 represents the angle cocks which may be of any usual form. Secured to each of the angle cocks 10 is an air pipe 11. This pipe 11 is connected with the train pipe 12 by means of a sleeve 13. This sleeve 13 only engages slightly with the pipes 11 and 12, as shown in Figs. 1 and 5, so that the pipe 12 will not be pulled from the car in case the angle cock becomes detached for the reasons above stated.

14 represents the dead-wood of the railway car. In order to secure the angle cock 10 to the dead-wood 14, or any other suitable portion of the car, I provide it with a lug or plate 15 which is formed integral with it but preferably with its hexagonal head 16. The lug or plate 15 is provided with bolt holes 17 through which pass bolts 18 which secure it to the dead-wood 14.

In Fig. 5 I have shown a slight modification to adapt the angle cock to be secured to a car in which the dead-wood 14 is turned with its flanges projecting forward. In this case I provide a lug or plate 19 which, like the lug 15, is formed integral with the hexagonal head of the cock, but which first projects upwardly, after which, however, it is turned over rearwardly so as to engage with the upper side of the flange 20 of the dead-wood 14 and is secured in position by means of the bolts 18 in a manner similar to the lug or plate 15 heretofore described.

It will be seen that, by my construction, a means is provided for securing the angle cock in position to prevent its loss without the use of a separate holder and at the same time it is secured to the car much more rigidly than is practicable with the separate holder and consequently the joint between the pipes 11 and 12 is not likely to become loosened so as to allow the escape of air and interfere with the proper working of the brake system.

Having fully described my invention, what I claim as new and desire to secure by Letters Patent of the United States is:

1. The combination with a railway car, of an air brake pipe therefor, an angle cock 11 for said air brake pipe, said angle cock being provided with an integral lug for securing it to said car.

2. The combination with a railway car, of an air brake pipe therefor, and an angle cock for said air brake pipe, said angle cock having a lug formed integral with its head for securing it to said car.

3. The combination with a railway car, of an air brake pipe therefor, an angle cock for said air brake pipe, and a lug formed integral with said angle cock and projecting upwardly therefrom, said lug being provided with bolt holes for securing it to the car.

4. The combination with a railway car, of an air brake pipe therefor, an angle cock for said air brake pipe, and a lug formed integral with said angle cock and projecting upwardly and then rearwardly therefrom, said lug being provided with bolt holes for securing it to said car.

In testimony whereof I have hereunto set my hand and affixed my seal in the presence of the two subscribing witnesses.

LOUIS A. HOERR. [L. S.]

Witnesses:
W. A. ALEXANDER,
ELIZABETH BAILEY.